United States Patent
Ahn et al.

(10) Patent No.: US 10,816,845 B2
(45) Date of Patent: Oct. 27, 2020

(54) LIQUID CRYSTAL DISPLAY

(71) Applicant: Samsung Display Co., Ltd., Yongin-Si, Gyeonggi-Do (KR)

(72) Inventors: Jung Hyun Ahn, Daejeon (KR); Hyo Suk Park, Seoul (KR); Ho-Yong Shin, Suwon-si (KR); Sang Hun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/407,112

(22) Filed: May 8, 2019

(65) Prior Publication Data

US 2020/0159064 A1    May 21, 2020

(30) Foreign Application Priority Data

Nov. 21, 2018   (KR) .......................... 10-2018-0144610

(51) Int. Cl.
*G02F 1/1335* (2006.01)
*G02F 1/13357* (2006.01)

(52) U.S. Cl.
CPC .. *G02F 1/133514* (2013.01); *G02F 1/133617* (2013.01); *G02F 2202/36* (2013.01)

(58) Field of Classification Search
CPC .. G02F 1/1335; G02F 1/361; G02F 1/133514; G02F 1/133617; G02F 2202/36; C09B 11/12

USPC .................................................. 349/106–109
See application file for complete search history.

(56) References Cited

U.S. PATENT DOCUMENTS

| | | | | |
|---|---|---|---|---|
| 2010/0271578 | A1* | 10/2010 | Ohkuma | G03F 7/0007 349/106 |
| 2013/0242238 | A1* | 9/2013 | Chen | G02B 5/223 349/106 |
| 2014/0091418 | A1* | 4/2014 | Taguchi | C09B 23/04 257/432 |
| 2016/0091757 | A1* | 3/2016 | Miki | G02F 1/133514 349/42 |
| 2017/0123120 | A1* | 5/2017 | Shirouchi | G02B 5/223 |

FOREIGN PATENT DOCUMENTS

| | | |
|---|---|---|
| KR | 10-0785923 B1 | 12/2007 |
| KR | 10-1289962 B1 | 7/2013 |
| KR | 10-2015-0078345 A | 7/2015 |
| KR | 10-2017-0041951 A | 4/2017 |
| KR | 10-1768232 B1 | 8/2017 |

* cited by examiner

*Primary Examiner* — Charles S Chang
(74) *Attorney, Agent, or Firm* — Innovation Counsel LLP

(57) ABSTRACT

A liquid crystal display may include a substrate and a color filter set disposed on the substrate. The color filter may include a blue color filter. The blue color filter may include a blue pigment, a violet dye, and a violet absorbing pigment. The violet absorbing pigment may absorb light having a wavelength in a range of 410 nm to 450 nm. The blue color filter may have transmittance in a range of 20% to 30% with respect to light having a wavelength in a range of 425 nm to 435 nm.

20 Claims, 11 Drawing Sheets

LIQUID CRYSTAL DISPLAY

CROSS-REFERENCE TO RELATED APPLICATION

This application claims priority to and the benefit of Korean Patent Application No. 10-2018-0144610 filed in the Korean Intellectual Property Office on Nov. 21, 2018; the entire contents of the Korean Patent Application are incorporated herein by reference.

BACKGROUND (a) Technical Field

The technical field relates to a liquid crystal display.

(b) Description of the Related Art

A liquid crystal display is a display device that typically includes two field generating electrodes, a liquid crystal layer interposed between the electrodes, and a backlight unit.

The liquid crystal display may apply a voltage to the field generating electrodes to generate an electric field. The electric field may rearrange liquid crystal molecules of the liquid crystal layer, thereby controlling transmission of light received from the backlight unit, for displaying an image.

The above information disclosed in this Background section is for enhancement of understanding of the background of the application. This Background section may contain information that does not form the prior art that is already known in this country to a person of ordinary skill in the art.

SUMMARY

Embodiments may be related to a liquid crystal display having desirable transmittance and desirable color reproducibility. The liquid crystal display may include a violet absorbing pigment in a color filter.

An embodiment may be related to a liquid crystal display. The liquid crystal display may include a substrate and a color filter set disposed on the substrate. The color filter set may include a blue color filter. The blue color filter may include a blue pigment, a violet dye, and a violet absorbing pigment. The violet absorbing pigment may absorb light having a wavelength in a range of 410 nm to 450 nm. The blue color filter may have transmittance in a range of 20% to 30% with respect to light having a wavelength in a range of 425 nm to 435 nm.

The violet absorbing pigment may be an organic material.

The violet absorbing pigment may be mixed in an amount in a range of 2 wt % to 6 wt % of a total content of the blue color filter.

The blue color filter may have absorption ratio in a range of 30% to 90% with respect to light having a wavelength in a range of 425 nm to 435 nm.

A color matching ratio of the liquid crystal display may be 95% or more.

The liquid crystal display may further include a light source, and the light source may include a light emitting element that generates white light.

An x color coordinate of light transmitted through the blue color filter may have a value in a range of 0.1750 to 0.1830.

A y color coordinate of light transmitted through the blue color filter may have a value in a range of 0.1430 to 0.1620.

A thickness of the color filter may be in a range of 2.5 μm to 3 μm.

An embodiment may be related to a liquid crystal display. The liquid crystal display may include the following elements: a substrate; a color filter set disposed on the substrate; a plurality of color converting layers disposed on the color filter set and including a first quantum dot material; a transmissive layer disposed on the color filter set; and a backlight unit for supplying light to the color filter and the color converting layer. The color filter set may include a blue color filter. The blue color filter may include a blue pigment, a violet dye, and a violet absorbing pigment. The violet absorbing pigment may absorb light having a wavelength in a range of 410 nm to 450 nm. The blue color filter may have transmittance in a range of 20% to 30% with respect to light having a wavelength in a range of 425 nm to 435 nm. The backlight unit may include a light emitting element that emits blue light or ultraviolet light.

The violet absorbing pigment may be an organic material.

The violet absorbing pigment may be mixed in an amount in a range of 2 wt % to 6 wt % of a total content of the blue color filter.

The blue color filter may have absorption ratio in a range of 30% to 90% with respect to light having a wavelength in a range of 425 nm to 435 nm.

A color matching ratio of the liquid crystal display may be 95% or more when a center wavelength of the blue light emitted from the backlight unit is 450 nm or less.

An x color coordinate of the blue color filter may have a value in a range of 0.1750 to 0.1830.

A y color coordinate of the blue color filter may have a value in a range of 0.1430 to 0.1620.

A thickness of the color filter may be in a range of 2.5 μm to 3 μm.

The backlight unit may include a light converting layer converting the blue light or the ultraviolet light into white light, and the light converting layer may include at least one of the first quantum dot material and a second quantum dot material.

The color converting layers may include a red color converting layer and a green color converting layer, the red color converting layer may convert a first portion of light supplied from the backlight unit into red light, and the green color converting layer may convert a second portion of light supplied from the backlight unit into green light.

The transmissive layer may transmit the blue light supplied from the backlight unit.

According to embodiments, transmittance and color reproducibility of a liquid crystal display may be optimize with a violet absorbing pigment included in a color filter of the liquid crystal display.

DETAILED DESCRIPTION OF EMBODIMENTS

Figure 1:
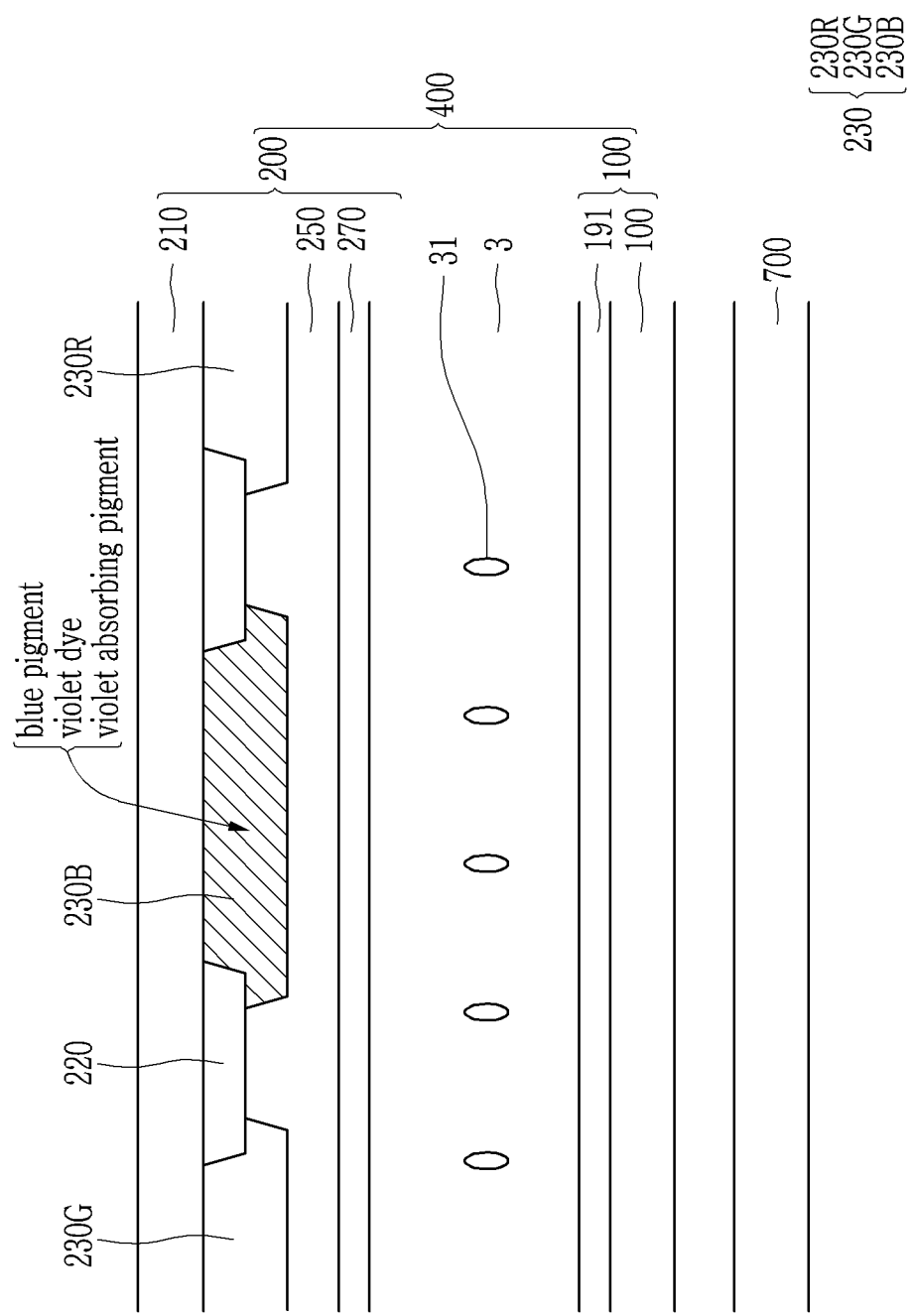
FIG. 1 schematically illustrates a cross-sectional view of a liquid crystal display according to an embodiment.

Example embodiments are described with reference to the accompanying drawings. As those skilled in the art would realize, the described embodiments may be modified in various different ways.

Like reference numerals may designate like elements in the specification.

In the drawings, thicknesses and/or sizes may be exaggerated for clarity.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

Unless explicitly described to the contrary, the word "comprise" and variations such as "comprises" or "comprising" may imply the inclusion of stated elements but not the exclusion of any other elements.

The term "liquid crystal display" may mean "liquid crystal display device." The term "absorption ratio" may mean "absorbance." The term "amount" may mean "mass" or "weight." The term "display panel" may mean "panel (included in a/the display device)."

FIG. 1 schematically illustrates a cross-sectional view of a liquid crystal display according to an embodiment.

Referring to FIG. 1, the liquid crystal display includes a display panel 400 and a backlight unit (BLU) 700 that supplies light to the display panel 400. The display panel 400 includes a first display panel 100, a second display panel 200 overlapping the first display panel 100, and a liquid crystal layer 3 disposed between the first display panel 100 and the second display panel 200.

The first display panel 100 may include an insulating substrate 110 made of transparent glass or plastic, a plurality of signal lines and a plurality of thin film transistors (not shown) formed on the insulating substrate 110, and a pixel electrode 191 connected to one of the thin film transistors. The plurality of signal lines may include gate lines (not shown) and data lines (not shown).

The second display panel 200 includes an insulating substrate 210 made of transparent glass or plastic, light blocking members 220, color filters 230, a planarization layer 250, and a common electrode 270.

The light blocking members 220 are formed on the insulating substrate 210 and are spaced from each other at a predetermined interval.

The color filters 230 are disposed between the light blocking members 220. The color filters 230 include a red color filter 230R, a green color filter 230G, and a blue color filter 230B. The color filter 230 may include a white color filter. The blue color filter 230B includes a blue pigment, a violet dye, and a violet absorbing pigment, and the violet absorbing pigment may absorb a part of light having a wavelength in a range of 410 nm to 450 nm.

The planarization layer 250 is disposed on the light blocking member 220 and the color filter 230. The planarization layer 250 fills a space between the color filters 230 and provides a planar surface.

The common electrode 270 for supplying a common voltage is disposed on the planarization layer 250.

The liquid crystal layer 3 including liquid crystal molecules 31 is disposed between the first display panel 100 and the second display panel 200.

The backlight unit 700 serves as a light source for supplying light to the display panel 400, and may include a plurality of light emitting elements. The light emitting elements may emit three primary colors, and may supply white light. When the backlight unit 700 supplies white light, the white light passes through the color filters 230 to display an image with combinations of red light, green light, and blue light.

A first portion of the white light supplied by the backlight unit 700 passes through the red color filter 230R to be viewed as red light, a second portion of the white light passes through the green color filter 230G to be viewed as green light, and a third portion of the white light passes through the blue color filter 230B to be viewed as blue light. By forming a triangle having vertex positions respectively corresponding to the red light, the blue light, and the green light on the color coordinates, a triangular color area may be obtained. The color coordinates includes of an x color coordinate for representing x components and includes a y color coordinate for representing y components.

A Digital Cinema Initiatives (DCI) reference coordinate system, which is a measurement reference specification of a color matching ratio, is set, and a triangular inner area formed by three vertexes of the DCI system is referred to as a reference area.

The color coordinates of the liquid crystal display vary as a wavelength of light supplied from the backlight unit 700 and the pigment component of the color filters 230 are changed. A triangular inner area formed by three vertexes of the changed coordinates is referred to as a variation area. The color matching ratio indicates a ratio of the variation area to the reference area, and the color matching ratio decreases as the changed coordinates become farther from the DCI specifications.

When a color area of a predetermined portion or more of the reference area formed by the DCI specifications can be expressed, high color reproducibility may be realized. In other words, when the color matching ratio of each light of different colors is high, the overall color reproducibility of the liquid crystal display may be high. The color matching ratio may be adjusted by adjusting the color coordinates.

In order to increase the light emitting efficiency of the liquid crystal display, since light energy increases as a wavelength is shortened, it may be necessary to shift a wavelength of the blue light generated from the backlight unit 700 to a short wavelength. For example, when a center wavelength of blue light is shifted from 451 nm to 447 nm, the light emitting efficiency may increase by 11%.

However, as the wavelength of the blue light supplied by the backlight unit 700 is shifted to a short wavelength, since the blue color coordinate is shifted, the color matching ratio may decrease. Specifically, blue color coordinate values include x color coordinate values (Bx) and y color coordinate values (By), and both the x color coordinate values (Bx) and the y color coordinate values (By) may be reduced in accordance with the blue light shift, thus the blue color coordinates may be shifted to a lower right end of the color coordinates.

As the center wavelength of the blue light is reduced to 450 nm or less, the color matching ratio may be significantly reduced. Particularly, when the center wavelength of the blue light is reduced to 447 nm, the color matching rate may be reduced by 1.15% or more. In other words, the light emitting efficiency and the color matching ratio are in a trade-off relationship.

The blue color filter 230B may include a blue pigment and a violet dye at a predetermined ratio to enhance coloring power. The blue pigment may be a main pigment having a higher mixing ratio, and the violet dye may be used as an auxiliary pigment having a lower mixing ratio.

If the violet dye is added to the blue pigment in this way, the x color coordinate values (Bx) of the blue color coordinate values shift from the DCI specifications to the right, thus the color matching rate is reduced. That is, as a wavelength of the light source is shifted to a short wavelength in order to improve the light emitting efficiency and a dye is added to increase coloring power, the color matching ratio is reduced, thus color reproducibility of the liquid crystal display may significantly deteriorate.

In the liquid crystal display according to an embodiment, the blue color filter 230B includes a violet cut (V-cut) pigment. In the blue color filter 230B, a blue pigment, a violet dye, and a violet cut (V-cut) pigment are mixed at predetermined ratios. The violet absorbing pigment may prevent deterioration of the color matching ratio.

Specifically, the violet absorbing pigment absorbs violet light in a certain region a transmissive spectrum. Because of the violet dye, the blue x color coordinate values Bx shifted to the right with respect to the DCI specifications may be shifted (and corrected) to the left, thus a desirable color matching ratio may be attained.

A content of the violet absorbing pigment may be in a range of 1 wt % to 10 wt %, for example, in a range of 3 wt % to 5 wt %, with respect to a total content of the blue color filter 230B.

The violet absorbing pigment may be an organic material.

The color filter 230 may have a thickness of from 2.5 μm to 3 μm.

Figure 2:
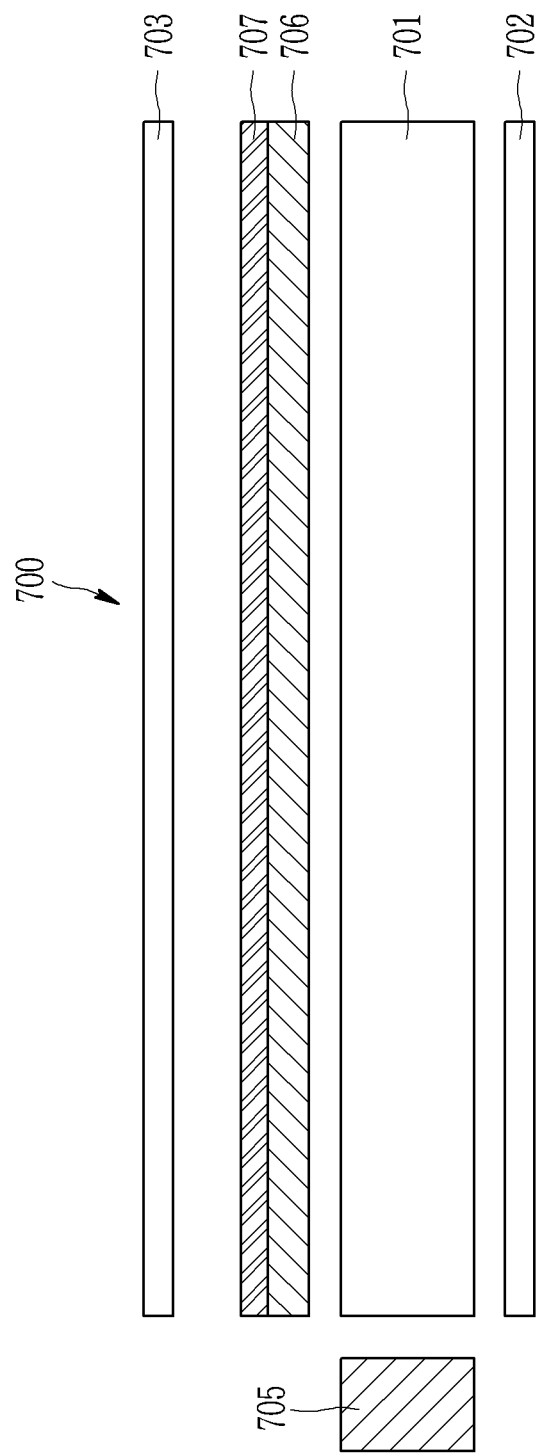
FIG. 2 illustrates a schematic side view of a backlight unit of a liquid crystal display according to an embodiment.

FIG. 2 illustrates a schematic side view of a backlight unit of a liquid crystal display 700 according to an embodiment.

Referring to FIG. 2, the backlight unit 700 includes a light guide plate 701, a reflection plate 702, a light diffusion plate 703, a light emitting element 705, and light converting layers 706 and 707.

The light guide plate 701 serves to convert linear light or dot light generated from the light emitting element 705 into surface light using a principle of total reflection.

The light emitting element 705 may include a plurality of blue light emitting diodes. The light emitting element 705 may be disposed at one side of the light guide plate 701.

The reflection plate 702 is disposed at a lower portion of the light guide plate 701 and reflects light that passes under the light guide plate 701, thereby reducing light loss.

The light diffusion plate 703 is disposed over the light guide plate 701 and scatters light emitted by the light guide plate 701, thereby uniformly spreading light on an entire surface of the display panel 400.

The light converting layers 706 and 707 may be disposed between the light guide plate 701 and the light diffusion plate 703. In some embodiments, the light converting layers 706 and 707 may be disposed on the light diffusion plate 703.

The light converting layers 706 and 707 include quantum dots, to convert blue light emitted from the blue light emitting diode into green light and red light, thereby generating white light. The two light converting layers 706 and 707 may be separate from each other. One may convert blue light to green light, and the other may convert blue light into red light. Each of them may include both quantum dots converting blue light to green light and quantum dots converting blue light into red light.

The two light converting layers 706 and 707 may be bonded to each other, or they may form a single layer including both quantum dots converting blue light into green light and quantum dots converting blue light into red light.

A shape of the quantum dots may be configured according to embodiments.

When the light source supplies blue light, the influence of shifting the light to a short wavelength of blue light to increase the light emitting efficiency may be larger than that in a case in which the light source supplies white light. The effect of the violet absorbing pigment of the blue color filter may also be larger in improving the color matching ratio.

Figure 3:
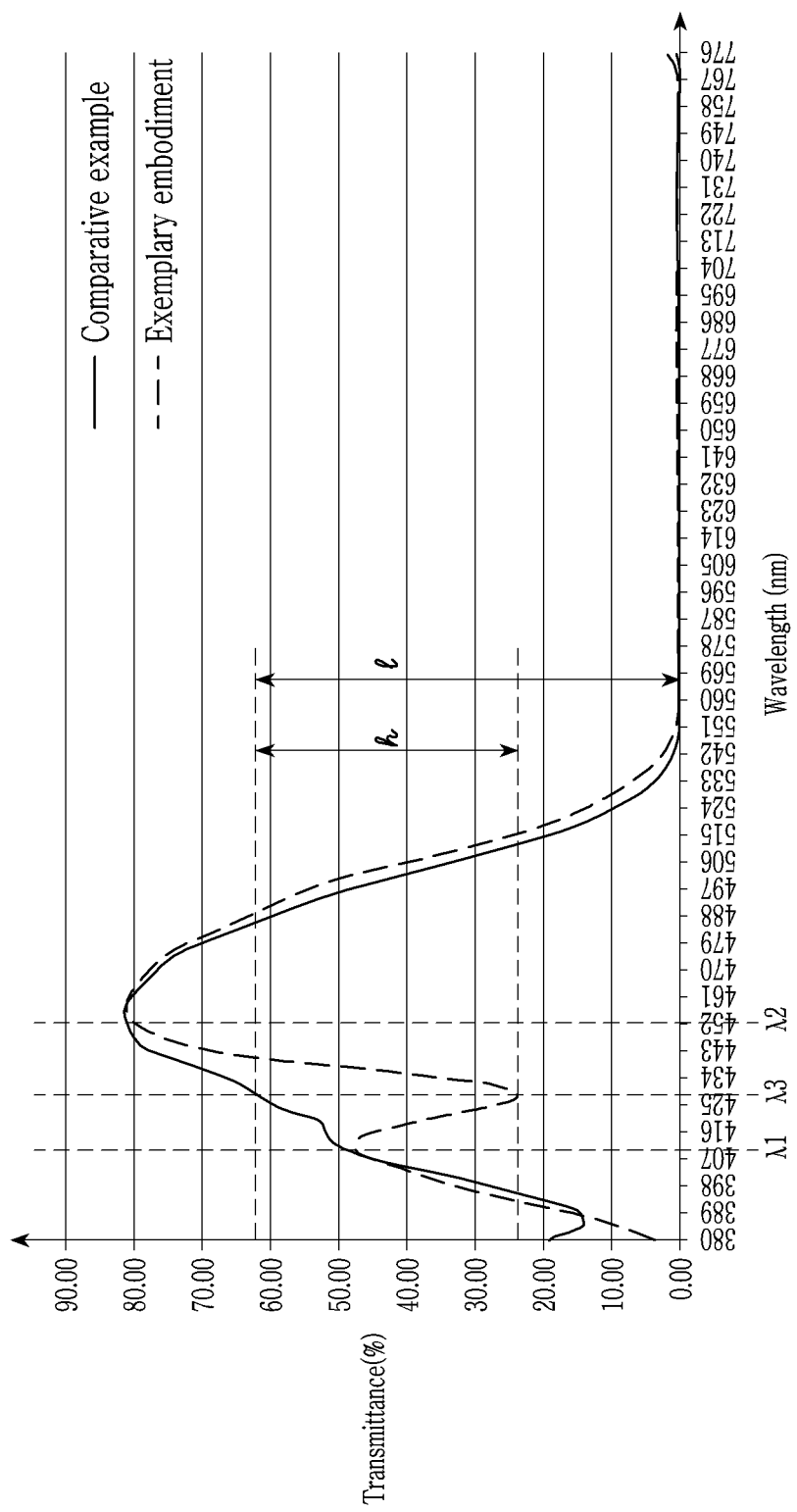
FIG. 3 illustrates a comparison graph of transmissive spectra of blue color filters of liquid crystal displays according to an embodiment and a comparative example.

FIG. 3 illustrates a comparison graph of transmissive spectra of blue color filters of liquid crystal displays according to an embodiment and a comparative example.

The comparative example is a case where the blue color filter 230B includes a blue pigment and a violet dye without including a violet absorbing pigment. The embodiment is a case where the blue color filter 230B includes a blue pigment, a violet dye, and a violet absorbing pigment. A horizontal axis indicates wavelength (nm), and a vertical axis indicates transmittance (%) of light that is transmitted.

A center wavelength of the blue light generated from the backlight unit 700 may be in a range of 440 nm to 460 nm. Referring to the comparative example, the center wavelength may be about 450 nm. When the center wavelength of the blue light is reduced to about 450 nm or less, the light emitting efficiency may increase as the wavelength of the blue light is shifted to a shorter wavelength, but color reproducibility deteriorates.

The blue color filter 230B according to the embodiment includes the violet absorbing pigment to absorb light in a predetermined range of the violet region, thereby increasing the color matching ratio of blue. Specifically, the violet absorbing pigment according to the embodiment absorbs a predetermined amount in a range of the absorbing region of the violet light region. The absorbing region is an area between a first wavelength (λ1) and a second wavelength (λ1).

The first wavelength (λ1) may be in a range of 400 nm to 420 nm, and may be about 410 nm. The second wavelength (λ2) may be in a range of 440 nm to 460 nm, and may be about 450 nm.

The violet absorbing pigment may have an absorption ratio (A) in a range of 30% to 90% at a third wavelength (λ3), which is a value in the absorbing region. When the transmittance of the comparative example is a first value (l) at the third wavelength (λ3), and when the transmittance difference between the comparative example and the embodiment is a second value (h) at the third wavelength (λ3), the absorption ratio (A) is as follows.

$$A = h/l \times 100$$

The violet absorbing pigment absorbs the light in the violet region by a ratio in a range of 30% to 90% at the third wavelength (λ3), and prevents the variation of the blue color coordinates due to the mixing of the violet dye, thereby preventing deterioration of the color matching ratio and realizing high color reproducibility. The third wavelength (λ3) may be in a range of 425 nm to 435 nm, and may be about 430 nm.

As the violet absorbing pigment absorbs light having a predetermined wavelength in the violet region, the blue color filter of the liquid crystal display according to the embodiment has transmittance in a range of 20% to 30% for light having a wavelength in a range of 425 nm to 435 nm.

Figure 4:
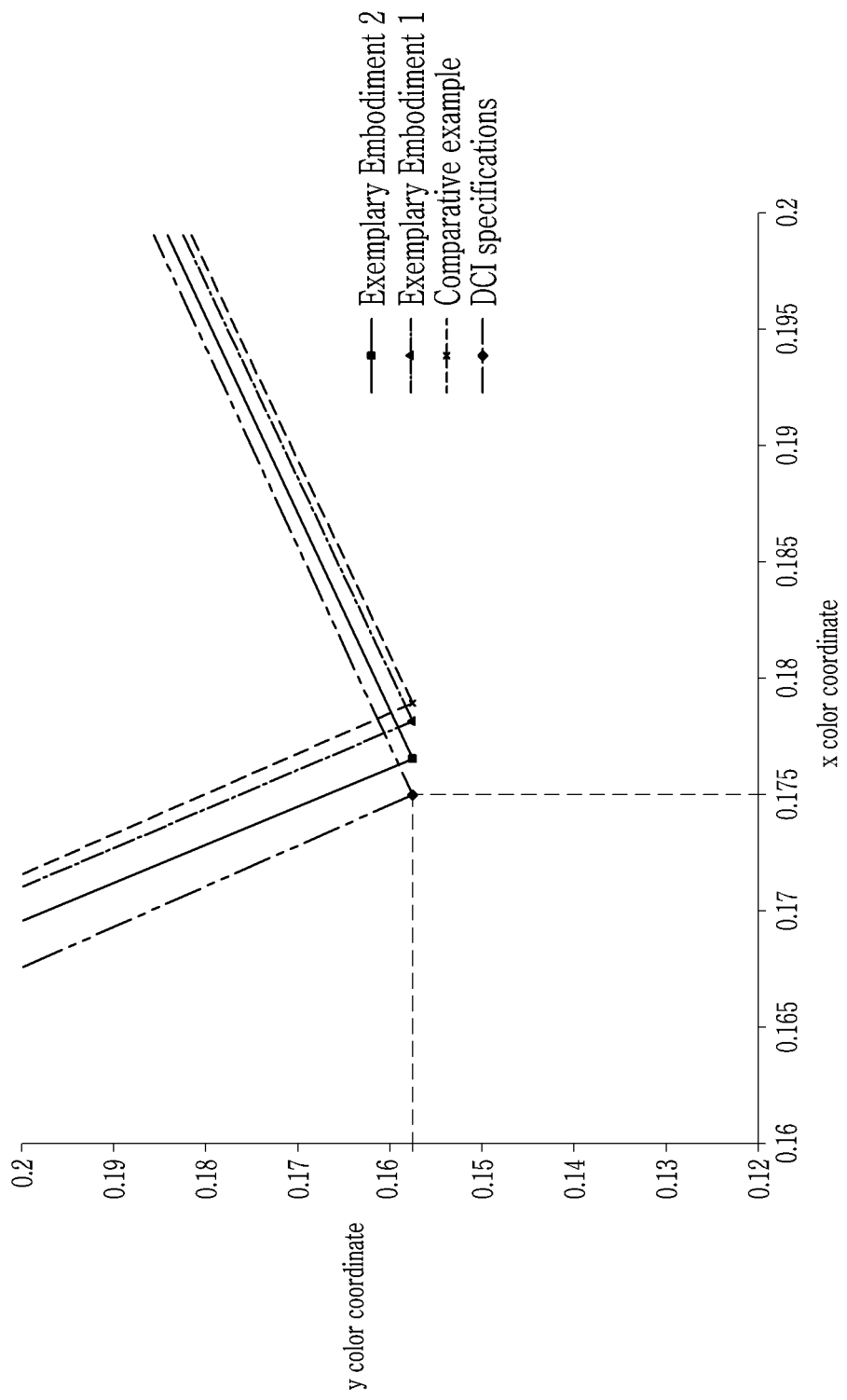
FIG. 4 illustrates color coordinate values of liquid crystal displays according to embodiments and a comparative example.
Figure 5:
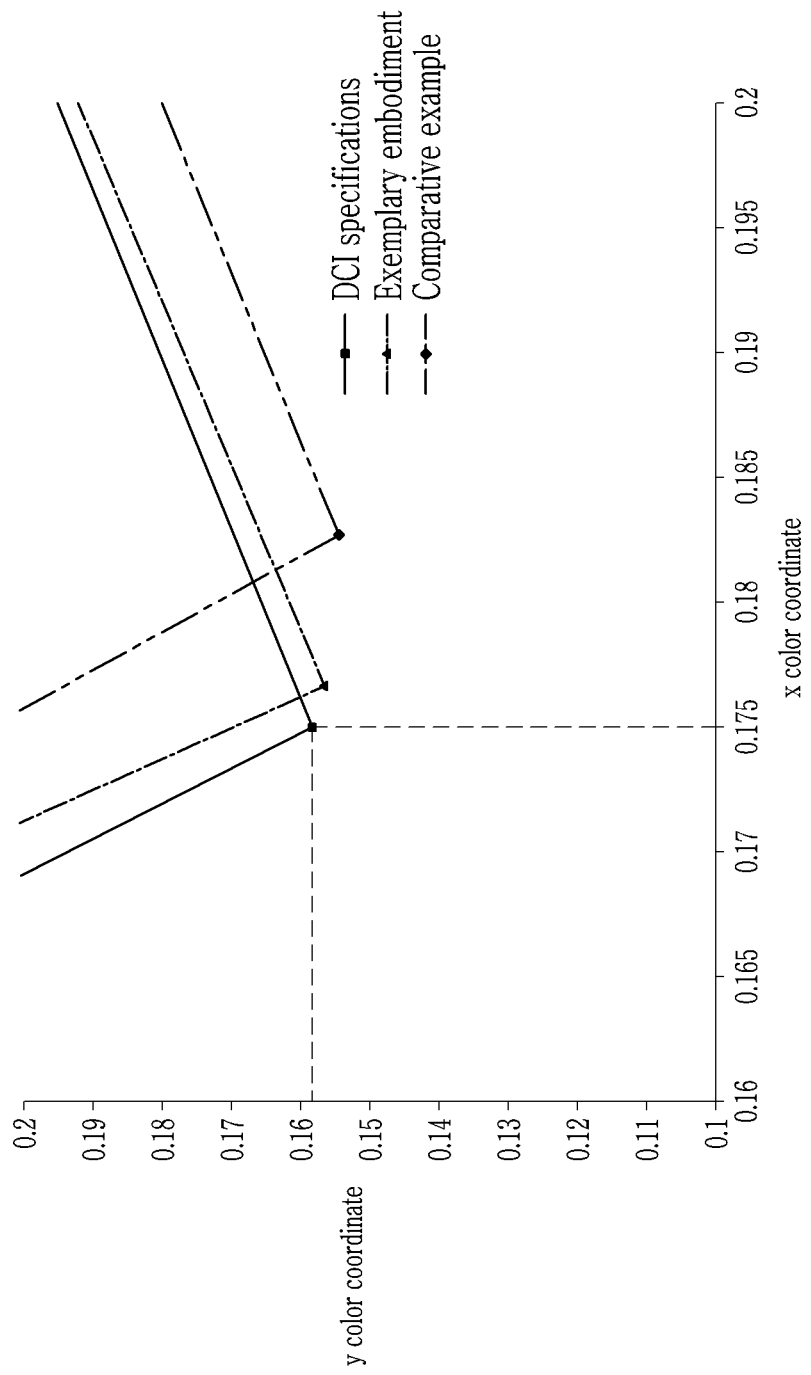
FIG. 5 illustrates color coordinate values of liquid crystal displays according to an embodiment and a comparative example.

FIG. 4 and FIG. 5 illustrate blue color coordinate values of liquid crystal displays according to embodiments and a comparative example. In FIG. 4 and FIG. 5, color coordinate values based on the CIE 1976 coordinate system are used.

Referring to FIG. 4, blue color coordinate values of the DCI specifications, a comparative example, and Exemplary Embodiments 1 and 2 are shown. The horizontal axis indicates the x color coordinate values (Bx), and the vertical axis indicates the y color coordinate values (By). A blue color coordinate value may be represented by (Bx, By).

A liquid crystal display of the comparative example includes a blue color filter including a blue pigment and a violet dye and not including a violet absorbing pigment, and liquid crystal displays according to Embodiments 1 and 2 include blue color filters in which a violet absorbing pigment is mixed in an amount in a range of 3 wt % and 5 wt % in a color blue color filter. The DCI specifications represent the position of the color coordinate values in which the color matching ratio is defined as 100%.

In the blue color coordinate values, the y color coordinate values (By) may be adjusted by a thickness of the blue color filter. Generally, as a thickness of a color filter increases, high color reproducibility is realized, but transmittance decreases. Since the x color coordinate values (Bx) shift from the DCI specifications to the right as the violet dye is added to the blue pigment, it is necessary to shift the x color coordinate values (Bx) back to the left toward the DCI specifications. However, unlike the y color coordinate values (By), it is difficult to shift the x color coordinate values (Bx) even if the thickness of the color filter is adjusted, due to the pigment characteristics of the blue color filter.

In each of the embodiments, a violet absorbing pigment may be added to absorb a predetermined amount of light in the violet region to shift the x color coordinate values (Bx) back to the left to be closer to the DCI specifications. In FIG. 4, when a value of the y color coordinate value (By) was 0.1575, variations of the x color coordinate value (Bx) were measured. Several x color coordinate values (Bx) according to different contents of the violet absorbing pigment are compared and described with reference to Table 1 below.

TABLE 1

|  | Bx | By | Color Matching Ratio |
|---|---|---|---|
| DCI Specifications | 0.1750 | 0.1580 |  |
| Comparative Example | 0.1793 | 0.1575 | 96.49% |
| Exemplary Embodiment 1 | 0.1786 | 0.1575 | 96.66% |
| Exemplary Embodiment 2 | 0.1769 | 0.1575 | 97.10% |

The x color coordinate value (Bx) of the DCI specifications is 0.1750, and the x color coordinate values (Bx) of the comparative example and the embodiments are greater than 0.1750. The y coordinate (By) of the DCI specifications is 0.1580.

Specifically, in the comparative example, the x coordinate value (Bx) is 0.1793 is most significantly greater than the 0.1750 of the DCI specifications. This is because the x coordinate values (Bx) shift to the right as the violet dye is mixed with the blue pigment to enhance the coloring power. In addition, the x color coordinate values (Bx) also shift to the right as the center wavelength of the blue light of the light source is shifted to a shorter wavelength. As the x color coordinate values (Bx) significantly deviate from the DCI specifications, the color matching ratio is significantly lowered.

The color matching ratio of the comparative example is 96.49%. That is, a color area loss of 3.51% occurs.

The liquid crystal display according to Exemplary Embodiment 1 includes a blue color filter in which the violet absorbing pigment is added. That is, the blue color filter of Exemplary Embodiment 1 includes the blue pigment, the violet dye, and the violet absorbing pigment. The content of the violet absorbing pigment to the total content is 3%.

The x color coordinate values (Bx) of Exemplary Embodiment 1 are less than the corresponding x color coordinate values (Bx) of the comparative example and are closer to the x color coordinate values (Bx) of the DCI specifications. The measured x color coordinate value (Bx) is 0.1786. The color matching ratio is 96.66%, more than 96.49% of the comparative example.

The blue color filter of the liquid crystal display according to Embodiment 2 includes a blue pigment, a violet dye, and a violet absorbing pigment, and the content of the violet absorbing pigment to the total content is 5 wt %.

The x color coordinate values (Bx) of Embodiment 2 are less than the corresponding x color coordinate values (Bx) of Embodiment 1 and are closer to the x color coordinate values (Bx) of the DCI specifications. The measured value of the x color coordinates (Bx) is 0.1769. The color matching ratio is improved to 97.10%, higher than the color matching ratio of the comparative example and the color matching ratio of Exemplary Embodiment 1. The color area loss is reduced to 2.90%.

According to Exemplary Embodiments 1 and 2, the color matching ratio is increased as the content of the violet absorbing pigment is increased.

Referring to FIG. 5, the blue color coordinate values of the DCI specifications, a comparative example, and an embodiment are shown. The blue color filter of the liquid crystal display according to the embodiment includes a violet absorbing pigment at 3 wt %. In FIG. 5, the shifting of the y chromatic coordinates (By) is also taken into consideration in order to simultaneously consider improvement of transmittance of the liquid crystal display.

The liquid crystal display according to the embodiment of FIG. 5 is such that the improvement rate of the transmittance is 10% or more, and the color matching ratio is 95% or more. For example, the improvement ratio of the transmittance may be about 10.4%. The x color coordinate values (Bx) are compared and described with reference to Table 2 below.

TABLE 2

|   | DCI Specifications | | Comparative Example | | Exemplary Embodiment | | Transmittance |
|---|---|---|---|---|---|---|---|
|   | Bx | By | Bx | By | Bx | By | Ratio |
| R | 0.496 | 0.525 | 0.5052 | 0.5188 | 0.5001 | 0.5228 |  |
| G | 0.098 | 0.577 | 0.1003 | 0.5697 | 0.1139 | 0.5740 |  |
| B | 0.175 | 0.158 | 0.1825 | 0.1445 | 0.1763 | 0.1611 |  |
| W |  |  | 0.1926 | 0.4392 | 0.1971 | 0.4597 | 110.4% |

In the DCI specifications, the x color coordinate value (Bx) is 0.1750, and the y color coordinate value (By) is 0.1580.

The blue color filter of the comparative example includes a blue pigment and a violet dye without including a violet absorbing pigment. The measured x color coordinate value (Bx) of the comparative example is 0.1825, and the corresponding y color coordinate value (By) is 0.1445. The x color coordinate value is significantly greater than the corresponding x color coordinate value of the DCI specifications, and the y color coordinate value is significantly lower than the corresponding y coordinate value of the DCI specifications, thus the color matching ratio is significantly lowered.

The blue color filter of the embodiment includes a blue pigment, a violet dye, and a violet absorbing pigment. The content of the violet absorbing pigment is in a range of about 2 wt % to 6 wt %, for example about 3 wt %.

The measured x color coordinate value (Bx) of the embodiment is 0.1763, and the corresponding y color coordinate value (By) is 0.1611. The x color coordinate value of the embodiment is less than that of the comparative example, and the y color coordinate value of the embodiment is greater than that of the comparative example. The coordinate values of the embodiment are substantially close to the corresponding values of the DCI specifications. Because the violet absorbing pigment partially absorbs the light in the violet region, the color matching ratio may be improved. The color matching ratio is 95% or more, and for example, may be 95.4%.

As the content of the violet absorbing pigment is increased in the blue color filter including the blue pigment and the violet dye, the color reproducibility of blue may be improved because a part of light having a short wavelength of the violet region is absorbed. Since the transmittance may be lowered as the color reproducibility is increased, an optimized mixing ratio for both desirable color reproducibility and desirable transmittance is required.

In an embodiment, when the content of the violet absorbing pigment is about 3 wt %, the transmittance is 110.4% or more as compared with the comparative example, thus having the improvement rate of the transmittance of 10% or more. As the color matching ratio is 95% or more, desirable color reproducibility may be.

The effect of improving the color matching ratio of a liquid crystal display according to an embodiment is described with reference to Table 3 below. Some configurations related to Table 3 may be analogous to or the same as some configurations related to Table 2. Measurement values in Table 3 are measurement results based on a color coordinate value of 0.150 in the x color coordinate of the blue DCI specifications.

TABLE 3

|   | ComparativeExample | | Embodiment | | Transmittance |
|---|---|---|---|---|---|
|   | Bx | By | Bx | By | Ratio |
| R | 0.6768 | 0.3075 | 0.6774 | 0.3186 |  |
| G | 0.2554 | 0.6591 | 0.2892 | 0.6514 |  |
| B | 0.1527 | 0.0553 | 0.1506 | 0.0605 |  |
| W | 0.2782 | 0.2854 | 0.2780 | 0.2855 | 110.2% |

The blue color filter of the comparative example includes a blue pigment and a violet dye without including a violet absorbing pigment. The x color coordinate value (Bx) of the comparative example is 0.1527, and the corresponding y color coordinate value (By) is 0.0553. The x color coordinate value of the comparative example is significantly greater than the x coordinate value of the DCI specifications, and the y color coordinate value of the comparative example is significantly lower than the y color coordinate value of the DCI specifications shift to the bottom side, thus the color matching ratio of the comparative example is significantly lower than the color matching ratio of the DCI specifications.

The blue color filter of the embodiment includes a blue pigment, a violet dye, and a violet absorbing pigment. The content of the violet absorbing pigment is in a range of about 2 wt % to 6 wt %, and for example, may be about 3 wt %.

The x color coordinate value (Bx) of the embodiment is 0.1506, and the corresponding y color coordinate value (By) is 0.0605. The x color coordinate value of the embodiment is lower than the x color coordinate value of the comparative example and is substantially close to the x color coordinate value of the DCI specifications. The y color coordinate value of the embodiment is higher than the y color coordinate value of the comparative example and is substantially closer to y color coordinate value of the DCI specifications. Because the violet absorbing pigment partially absorbs the light in the violet region, the color matching ratio may be improved. In this embodiment, the color matching ratio is 95% or more, and the transmittance is 110.2% of the comparative example, thus the improvement ratio is about 10% or more.

Figure 6:
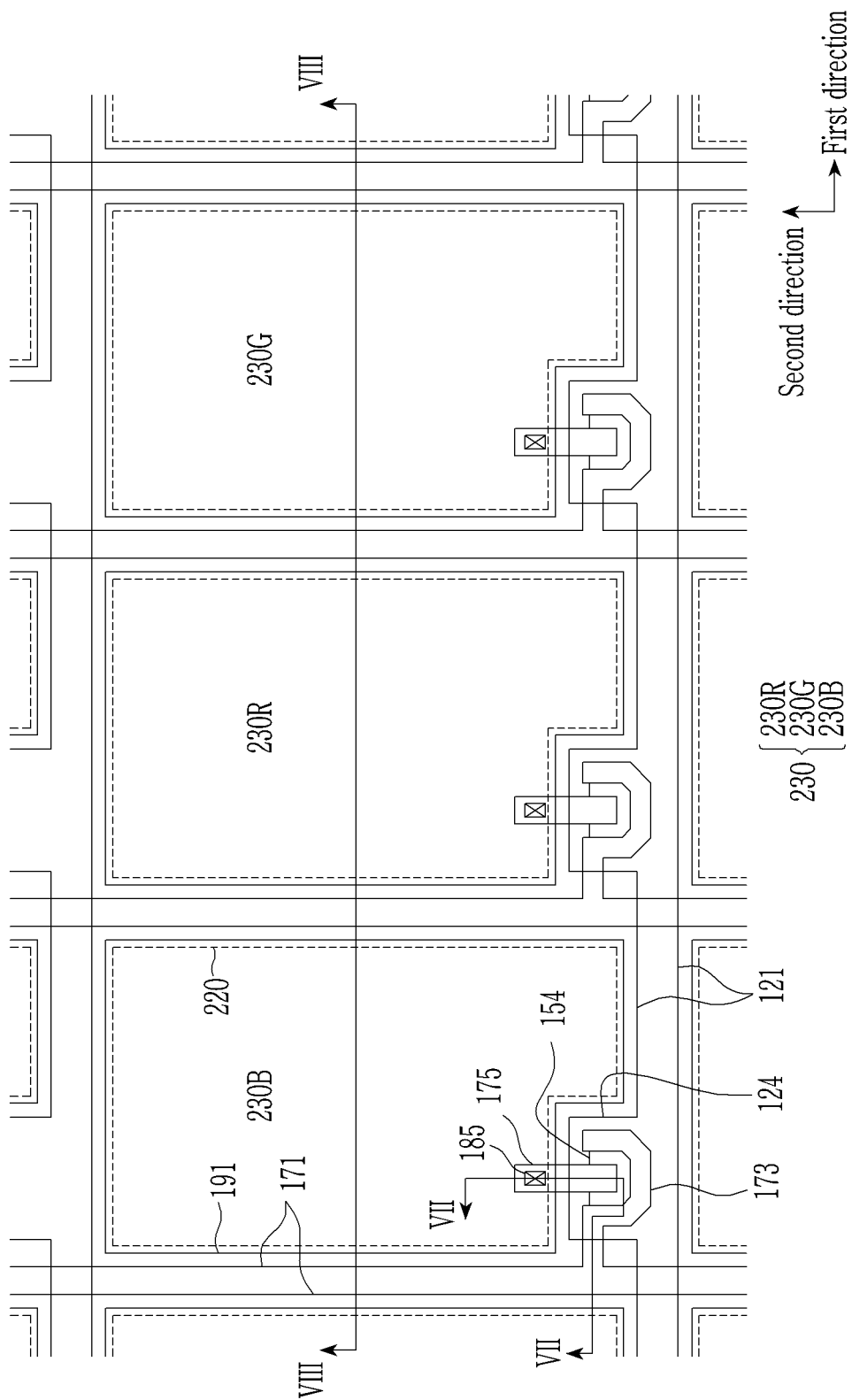
FIG. 6 illustrates a layout diagram (or plan view) of a liquid crystal display according to an embodiment.
Figure 7:
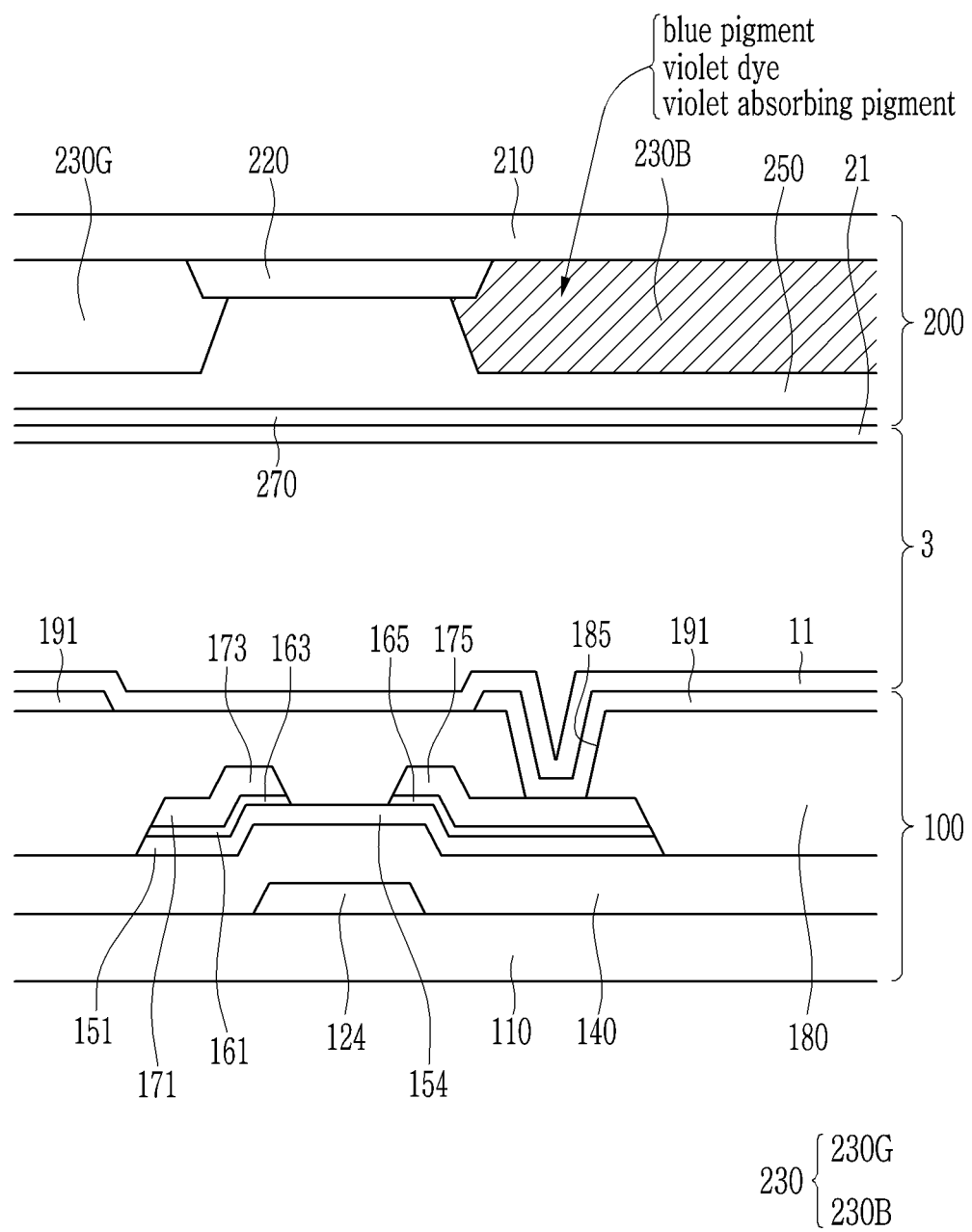
FIG. 7 illustrates a cross-sectional view taken along line VII-VII of the liquid crystal display of FIG. 6 according to an embodiment.
Figure 8:
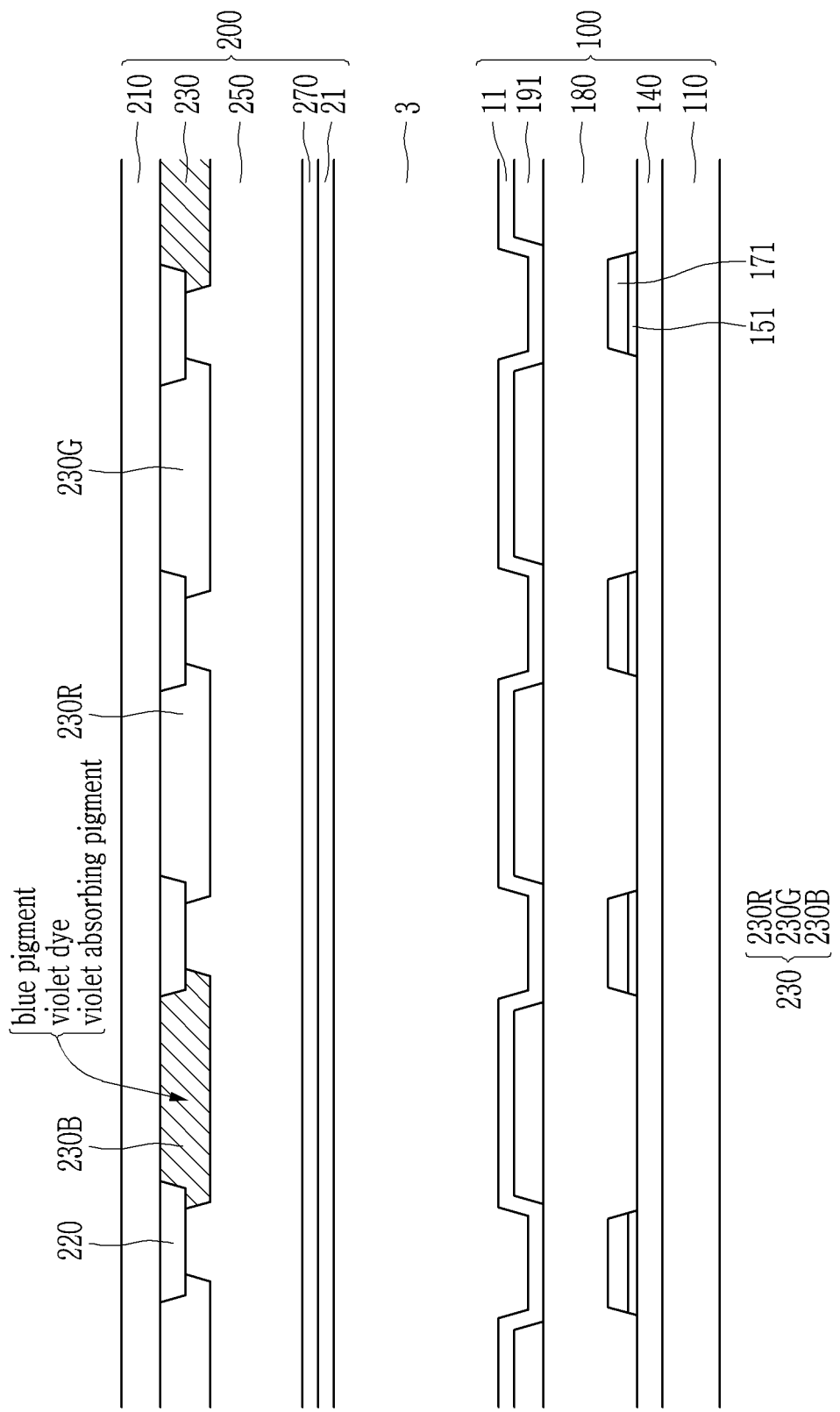
FIG. 8 illustrates a cross-sectional view taken along line VIII-VIII of the liquid crystal display of FIG. 6 according to an embodiment.

FIG. 6 illustrates a layout diagram of a liquid crystal display according to an embodiment, FIG. 7 illustrates a cross-sectional view taken along line VII-VII of the liquid crystal display of FIG. 6 according to an embodiment, and FIG. 8 illustrates a cross-sectional view taken along line VIII-VIII of the liquid crystal display of FIG. 6 according to an embodiment. Some features of the liquid crystal display may be analogous to or identical to some features discussed above with reference to one or more of FIG. 1 to FIG. 5.

Referring to FIG. 6 to FIG. 8, the liquid crystal display includes a first display panel 100, a second display panel 200 overlapping the first display panel 100, and a liquid crystal layer 3 interposed between the two display panels 100 and 200.

The first display panel 100 may include an insulating substrate 110, a gate line 121, a gate insulating film 140, a semiconductor layer 151, contact members 161 and 165, a data line 171, a passivation film 180, a pixel electrode 191, and a first alignment film 11.

A gate conductor (set) including the gate line 121 and a gate electrode 124 is disposed on one surface of the insulating substrate 110 made of transparent glass, plastic, or the like. The gate line 121 may extend in a first direction. The gate conductor may include various metals or conductors, and may have a multi-layered structure.

The gate insulating film 140 made of an insulating material such as a silicon nitride or a silicon oxide is disposed on the gate line 121.

The semiconductor layer 151 is disposed on the gate insulating film 140. The semiconductor layer 151 includes a plurality of protrusions 154 extending toward the gate electrode 124.

A plurality of linear ohmic contact members 161 and island-shaped ohmic contact members 165 are disposed on the protrusion 154 of the semiconductor layer 151. The linear ohmic contact member 161 has a plurality of protrusions 163, and the protrusions 163 and the island-shaped ohmic contact members 165 may be disposed on the protrusions 154 of the semiconductor layer 151 in pairs.

A plurality of data lines 171, a plurality of source electrodes 173 connected to the plurality of data lines 171, and a plurality of drain electrodes 175 facing the source electrodes 173 are disposed on the ohmic contact members 161 and 165 and the gate insulating film 140.

The data line 171 transmits a data signal, and extends in a second direction perpendicular to the first direction to cross the gate line 121.

The source electrode 173 may extend from the data line 171 and overlap the gate electrode 124. The source electrode 173 may extend toward the gate electrode 124 to have a U-shape, but this is merely an example, and the source electrode may have various modified shapes.

The drain electrode 175 may be separated from the data line 171, and may have a bar shape extending to a center of the source electrode 173 as shown in FIG. 6.

The ohmic contact members 161, 163, and 165 are present between the semiconductor 151 and the data line 171, between the semiconductor 154 and the source electrode 173, and between the semiconductor 154 and the drain electrode 175, for reducing contact resistance. In addition, the ohmic contact members 161, 163, and 165 may have substantially the same planar pattern as the data line 171, the source electrode 173, and the drain electrode 175.

A portion of the semiconductor layer 151 may not overlap the data line 171 and the drain electrode 175 in a region between the source electrode 173 and the drain electrode 175. The semiconductor layer 151 may have substantially the same planar shape as the data line 171 and the drain electrode 175 except for the portion that does not overlap.

One gate electrode 124, one source electrode 173, and one drain electrode 175 forms one thin film transistor (TFT) together with the protrusion 154 of the semiconductor layer 151, and a channel of the thin film transistor is formed in the protrusion 154 between the source electrode 173 and the drain electrode 175.

The passivation film 180 is disposed on the data line 171, the drain electrode 175, and the protrusion 154 of the exposed semiconductor layer. The passivation film 180 may include an inorganic insulating material such as a silicon nitride or a silicon oxide, an organic insulating material, a low dielectric constant insulating material, and the like.

A contact hole 185 for exposing a portion of the drain electrode 175 is formed in the passivation film 180.

The pixel electrode 191 is disposed on the passivation film 180. The pixel electrode 191 is physically and electrically connected to the drain electrode 175 through the contact hole 185, and receives a data voltage from the drain electrode 175. The pixel electrode 191 may include a transparent conductive material or a reflective metal. Although not shown, the pixel electrode 191 may be formed of a plurality of small electrodes or a fine slit electrode.

The first alignment layer 11 may be disposed on the pixel electrode 191.

The second display panel 200 may include an insulating substrate 210, a light blocking member 220, color filters 230, a planarization layer 250, a common electrode 270, and a second alignment film 21.

The light blocking member 220 is disposed on the insulating substrate 210 made of transparent glass or plastic. The light blocking member 220 blocks light leakage between the pixel electrodes 191 and defines an opening area facing the pixel electrode 191. The light blocking member 220 may overlap the data line 171 and extend in the second direction. Although not shown, the light blocking member 220 may further include a horizontal portion overlapping the gate line 121 and extending in the first direction.

The color filters 230 are disposed on the insulating substrate 210 and the light blocking member 220. A color filter 230 is disposed between two portions of the light blocking member 220, and opposite ends of the color filter 230 may overlap the light blocking member 220. The color filter 230 is mostly present in a region surrounded by the light blocking member 220, and may extend along a column of the pixel electrode 191.

Each color filter 230 may display one of the primary colors, such as the three primary colors of red, green, and blue. In an embodiment, the color filter 230 includes the red color filter 230R, the green color filter 230G, and the blue color filter 230B.

The blue color filter 230B includes a blue pigment, a violet dye, and a violet absorbing pigment.

The blue color filter 230B includes the violet absorbing pigment such that a part of violet light is absorbed. Advantageously, the color matching ratio is desirable as the x color coordinate values (Bx) are substantially consistent with the DCI specifications.

The violet absorbing pigment may absorb a portion of violet light having a wavelength in the range of 410 nm to 450 nm. Based on the central wavelength within this absorbing region, its absorption ratio may be in a range of 30% to 90% compared to a blue color filter that does not include the violet absorbing pigment.

The violet absorbing pigment may be an organic material.

As the content of the violet absorbing pigment is increased in the blue color filter 230B, the color matching ratio is improved, but when the content of the violet absorbing pigment is increased, the transmittance may be decreased. Therefore, in order to realize high color reproducibility while achieving high transmittance, it is preferable to optimize the content of the violet absorbing pigment to optimize the color coordinate values. In the embodiment, the content of the violet absorbing pigment may be in a range of 2 wt % to 6 wt %, particularly about 3 wt %, relative to the total content of the blue color filter 230B. Within the above range, a color matching ratio of 95% or more may be achieved while the transmittance is increased by 10% or more.

A thickness of the color filter 230 may be in a range of 2.5 μm to 3 μm.

The planarization layer 250 is disposed on the light blocking member 220 and the color filter 230. The planarization layer 250 may include an inorganic insulating material or an organic insulating material to prevent exposure of the color filter 230 and provide a planar surface. The planarization layer 250 may be omitted.

The common electrode 270 to which a common voltage is applied is disposed on the planarization layer 250.

The second alignment layer 21 may be disposed on the common electrode 270.

The liquid crystal layer 3 including liquid crystal molecules 31 is disposed between the first display panel 100 and the second display panel 200.

Figure 9:
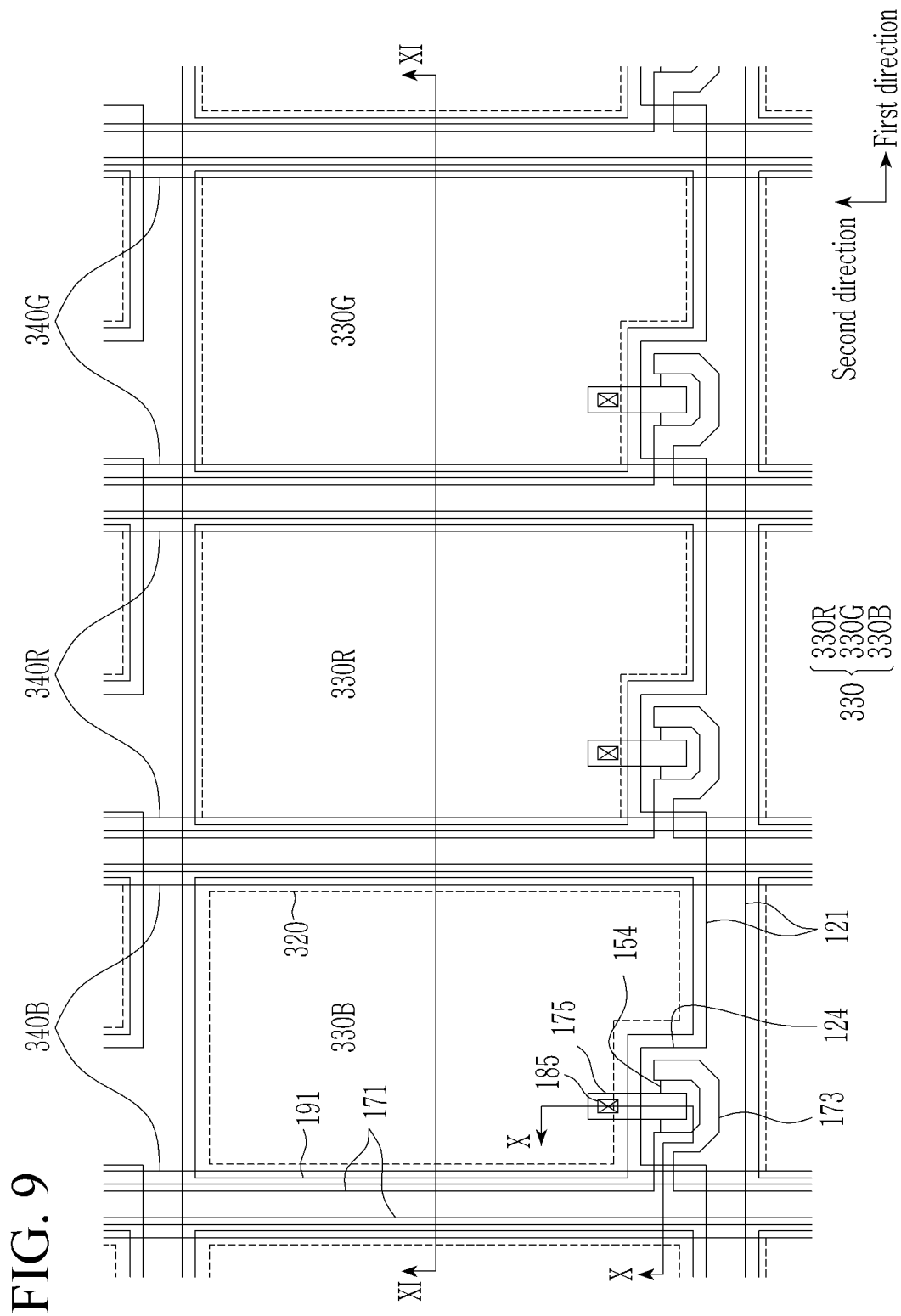
FIG. 9 illustrates a layout diagram of a liquid crystal display according to an embodiment according to an embodiment.
Figure 10:
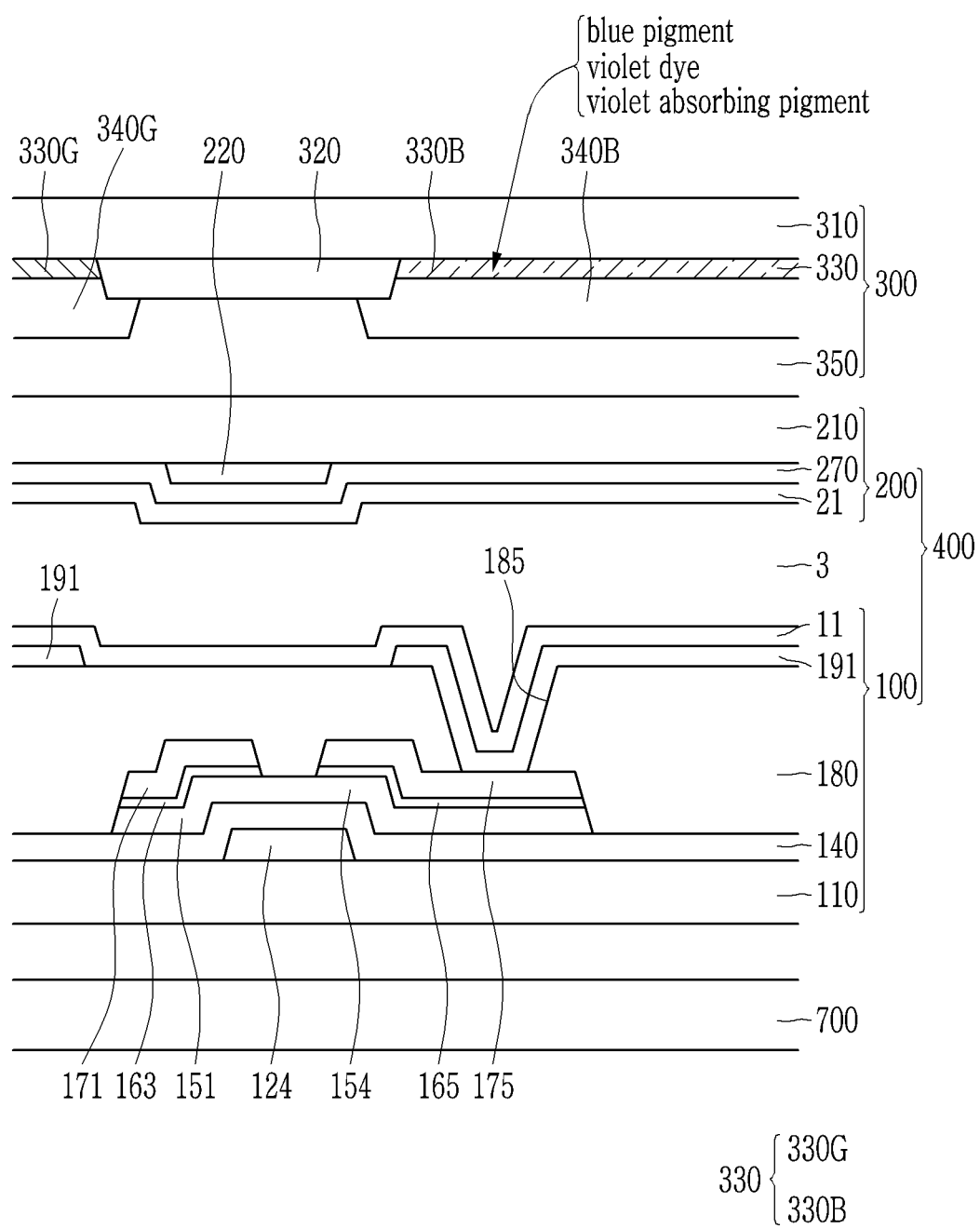
FIG. 10 illustrates a cross-sectional view taken along line X-X of the liquid crystal display of FIG. 9 according to an embodiment.
Figure 11:
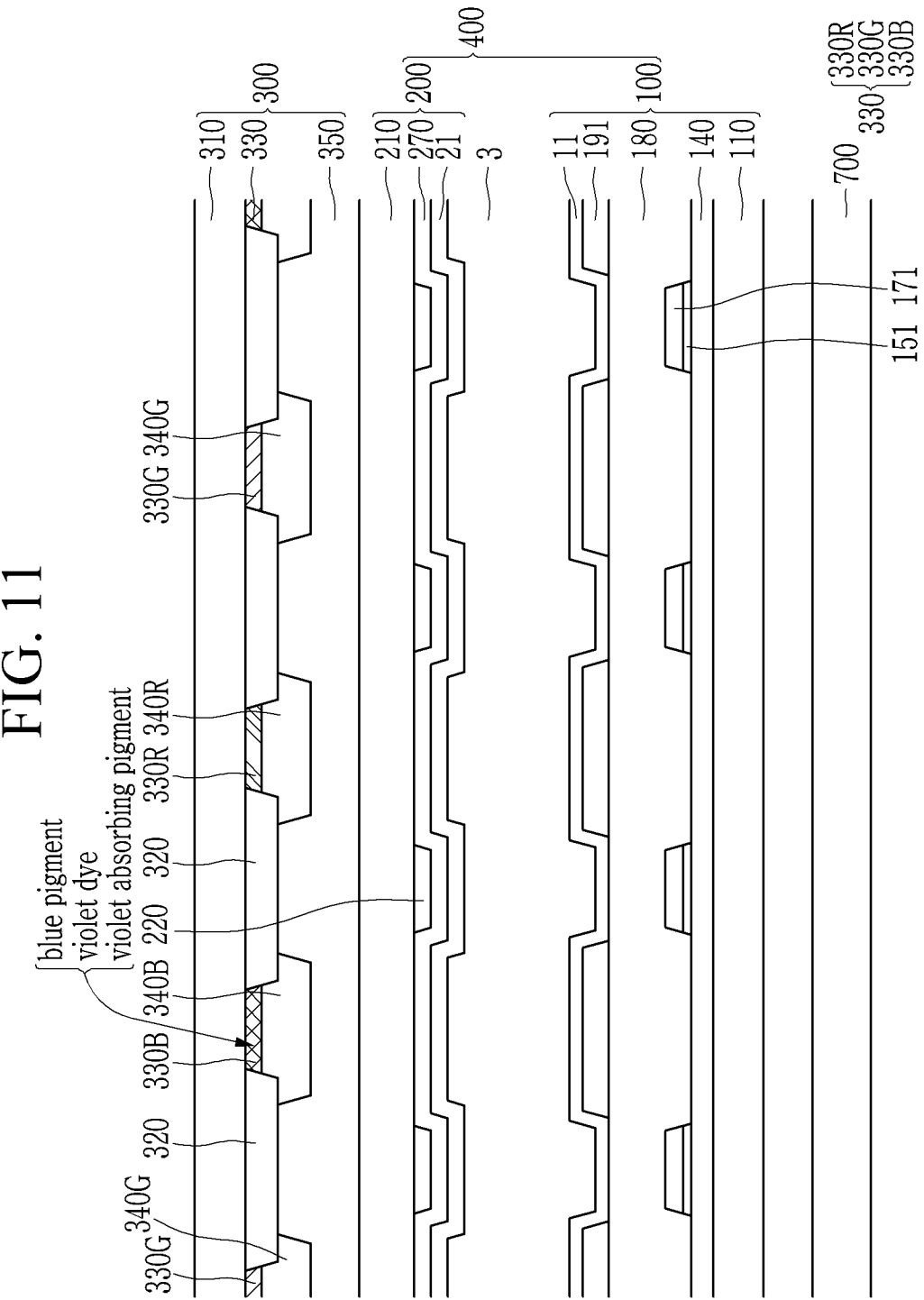
FIG. 11 illustrates a cross-sectional view taken along line XI-XI of the liquid crystal display of FIG. 9 according to an embodiment.

FIG. 9 illustrates a layout diagram of a liquid crystal display according to an embodiment, FIG. 10 illustrates a cross-sectional view taken along line X-X of the liquid crystal display of FIG. 9, and FIG. 11 illustrates a cross-sectional view taken along line XI-XI of the liquid crystal display of FIG. 9. Some features of the liquid crystal display may be analogous to or identical to some features discussed above with reference to one or more of FIG. 1 to FIG. 8.

Referring to FIG. 9 to FIG. 11, a liquid crystal display includes a display panel 400, a backlight unit 700 for supplying light to the display panel 400, and a color converting panel 300. The display panel 400 includes a first display panel 100, a second display panel 200 overlapping the first display panel 100, and a liquid crystal layer 3 interposed between the two display panels 100 and 200.

The backlight unit 700 may include light converting layers for converting blue light or ultraviolet light into white light. The backlight unit may include a light emitting elements that emit blue light or ultraviolet light. The light converting layers may include quantum dots.

The second display panel 200 may include an insulating substrate 210, a light blocking member 220, a common electrode 270, and a second alignment layer 21.

The color converting panel 300 includes a substrate 310, a light blocking member 320, color filters 330, color converting layers 340R and 340G, a transmissive layer 340B, and a planarization layer 350. The color converting layers 340R and 340G respectively convert portions of incident blue light into red light and green light, and the transmissive layer 340B transmits a portion of the incident blue light.

The light blocking member 320 and a plurality of color filters 330 are disposed on the substrate 310.

The light blocking member 320 may overlap the light blocking member 220 and extend in the second direction. In addition, a portion of the light blocking member 320 may overlap the gate line 121 and the thin film transistor and may extend in the first direction. The light blocking member 320 may have a lattice structure including a horizontal portion extending in the first direction and a vertical portion extending in the second direction.

The light blocking member 320 may include only vertical portions extending in the second direction. The gate line 121 and the thin film transistor may be blocked from light by the light blocking member 220.

The color filters 330 may be disposed between the light blocking members 320, and may include a red color filter 330R, a green color filter 330G, and a blue color filter 330B. In an embodiment, the red color filter 330R and the green color filter 330G may be unnecessary.

The blue color filter 330B includes a blue pigment, a violet dye, and a violet absorbing pigment.

The blue color filter 330B includes the violet absorbing pigment such that a part of violet light is absorbed. Advantageously, the color matching ratio is desirable as the x color coordinate values (Bx) are substantially consistent with the DCI specifications.

In the liquid crystal display including the color converting panel 300 including the quantum dot material, since the blue light is supplied from the backlight unit 700, the influence of the shift of the wavelength of the blue light is larger, and thus the effect of improving the display quality due to the adjustment of the pigment content of the blue color filter may be greater. Given the same transmittance improvement, the color matching ratio may be more than 95.4%.

The violet absorbing pigment may absorb a portion of the violet light having a wavelength in the range of 410 nm to 450 nm. Based on the central wavelength within this absorbing region, its absorption ratio may be between 30% and 90% compared to a blue color filter that does not include the violet absorbing pigment.

The violet absorbing pigment may be an organic material.

It is necessary to optimize the content of the violet absorbing pigment in the blue color filter 330B with a content that optimizes the color coordinate values so as to realize both satisfactory color reproducibility and satisfactory transmittance. In an embodiment, the content of the violet absorbing pigment may be in a range of 2 wt % to 6 wt %, particularly about 3 wt %, relative to the total content of the blue color filter 330B.

The color filter 230 may have a thickness in a range from 2.5 μm to 3 μm.

The green color converting layer 340G, the red color converting layer 340R, and the transmissive layer 340B are disposed on the color filters 330. The color converting layers 340R and 340G include quantum dots. The quantum dots may convert incident light into green light and red light, respectively.

A shape of the quantum dots may be configured according to embodiments, and may be a spherical, pyramidal, multi-arm, cubic nanoparticle, nanotube, nano-wire, nano-fiber, or nano-plate particle shape.

The planarization layer 350 is disposed on the light blocking member 320, the green color converting layer 340G, the red color converting layer 340R, and the transmissive layer 340B. The planarization layer 350 fills spaces between the red color converting layer 340R, the green color converting layer 340G, and the transmissive layer 340B, and provides a planar surface.

While example embodiments have been described, practical embodiments are not limited to the described embodiments. Practical embodiments are intended to cover various modifications and equivalent arrangements within the scope of the appended claims.

What is claimed is:
1. A liquid crystal display comprising:
a substrate; and
a color filter set disposed on the substrate,
wherein the color filter set includes a blue color filter,
wherein the blue color filter includes a blue pigment, a violet dye, and a violet absorbing pigment,
wherein the violet absorbing pigment absorbs light having a wavelength in a range of 410 nm to 450 nm, and
wherein the blue color filter has transmittance in a range of 20% to 30% with respect to light having a wavelength in a range of 425 nm to 435 nm.

2. The liquid crystal display of claim 1, wherein the violet absorbing pigment is an organic material.

3. The liquid crystal display of claim 1, wherein the violet absorbing pigment is mixed in an amount in a range of 2 wt % to 6 wt % of a total content of the blue color filter.

4. The liquid crystal display of claim 1, wherein the blue color filter has absorption ratio in a range of 30% to 90% with respect to light having a wavelength in a range of 425 nm to 435 nm.

5. The liquid crystal display of claim 4, wherein a color matching ratio of the liquid crystal display is 95% or more.

6. The liquid crystal display of claim 1, further comprising a light source, wherein the light source includes a light emitting element that generates white light.

7. The liquid crystal display of claim 1, wherein an x color coordinate of light transmitted through the blue color filter has a value in a range of 0.1750 to 0.1830.

8. The liquid crystal display of claim 7, wherein a y color coordinate of light transmitted through the blue color filter has a value in a range of 0.1430 to 0.1620.

9. The liquid crystal display of claim 1, wherein a thickness of the color filter is in a range of 2.5 µm to 3 µm.

10. A liquid crystal display comprising:
a substrate;
a color filter set disposed on the substrate;
a plurality of color converting layers disposed on the color filter set and including a first quantum dot material;
a transmissive layer disposed on the color filter set; and
a backlight unit for supplying light to the color filter and the color converting layer,
wherein the color filter includes a blue color filter,
wherein the blue color filter includes a blue pigment, a violet dye, and a violet absorbing pigment,
wherein the violet absorbing pigment absorbs light having a wavelength in a range of 410 nm to 450 nm,
wherein the blue color filter has transmittance in a range of 20% to 30% with respect to light having a wavelength in a range of 425 nm to 435 nm, and
wherein the backlight unit includes a light emitting element that emits blue light or ultraviolet light.

11. The liquid crystal display of claim 10, wherein the violet absorbing pigment is an organic material.

12. The liquid crystal display of claim 10, wherein the violet absorbing pigment is mixed in an amount in a range of 2 wt % to 6 wt % of a total content of the blue color filter.

13. The liquid crystal display of claim 10, wherein the blue color filter has absorption ratio in a range of 30% to 90% with respect to light having a wavelength in a range of 425 nm to 435 nm.

14. The liquid crystal display of claim 13, wherein a color matching ratio of the liquid crystal display is 95% or more when a center wavelength of the blue light emitted from the backlight unit is 450 nm or less.

15. The liquid crystal display of claim 10, wherein an x color coordinate of the blue color filter has a value in a range of 0.1750 to 0.1830.

16. The liquid crystal display of claim 15, wherein a y color coordinate of the blue color filter has a value in a range of 0.1430 to 0.1620.

17. The liquid crystal display of claim 10, wherein a thickness of the color filter is in a range of 2.5 µm to 3 µm.

18. The liquid crystal display of claim 10, wherein the backlight unit includes a light converting layer converting the blue light or the ultraviolet light into white light, and
the light converting layer includes at least one of the first quantum dot material and a second quantum dot material.

19. The liquid crystal display of claim 10, wherein the color converting layers include a red color converting layer and a green color converting layer,
the red color converting layer converts a first portion of light supplied from the backlight unit into red light, and
the green color converting layer converts a second portion of light supplied from the backlight unit into green light.

20. The liquid crystal display of claim 10, wherein the transmissive layer transmits the blue light supplied from the backlight unit.

* * * * *